E. W. SMITH.
OZONIZER.
APPLICATION FILED JUNE 20, 1907.
921,903.
Patented May 18, 1909.
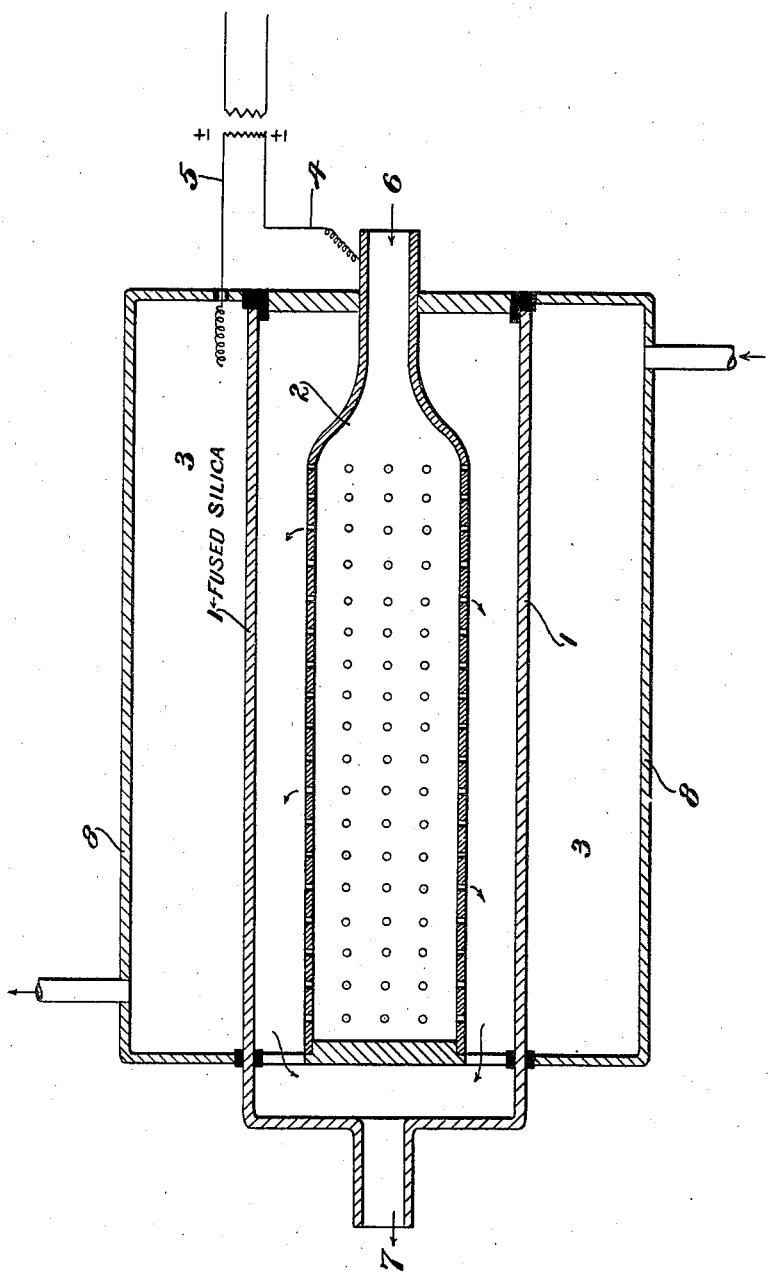
Witnesses
Inventor
Edward W. Smith.
By
Augustus B. Stoughton
Attorney

UNITED STATES PATENT OFFICE.

EDWARD WANTON SMITH, OF PHILADELPHIA, PENNSYLVANIA.

OZONIZER.

No. 921,903.        Specification of Letters Patent.        Patented May 18, 1909.

Application filed June 20, 1907. Serial No. 379,851.

*To all whom it may concern:*

Be it known that I, EDWARD WANTON SMITH, a citizen of the United States, and resident of Philadelphia, in the county of Philadelphia and State of Pennsylvania, have invented certain new and useful Improvements in Ozonizers, of which the following is a specification.

The present invention relates to ozonizers in which use is made of a dielectric. Simplicity and high efficiency are advantages of this kind of ozonizer, but this class of ozonizers have heretofore had the great disadvantage of unreliability owing to the fact that the extreme electrical stress exerted upon and the exacting temperature conditions required by the dielectric have proven very difficult to meet.

Objects of the present invention are to meet these conditions and produce an ozonizer of high efficiency, reliability and endurance.

Many different substances have been tried or suggested for use as dielectrics, but the selection has in practice narrowed down to two classes of material, namely, those of the micanite class which are made by cementing or otherwise consolidating numerous small sheets or plates of mica into a large sheet or tube of the requisite size, and those of glass or enamel made into plates or tubes or baked as an enamel covering to one of the electrodes. The objections to the use of glass are two-fold:—first, it is sensitive to conditions in temperature and as there is required an electrical stress of many thousand volts across a dielectric in an ozonizer a large amount of heat is developed therein, which in turn develops strains that may and do result in a break down, which causes more or less injury to the entire electrical system;—and second, as glass becomes heated, it loses its insulating properties and at a red heat becomes a conductor. This property accentuates the above objection because any part of the glass, carrying by chance more current than other parts, becomes heated therefore a poor insulator and so tends to take more current and to become further heated until finally a rupture ensues. Efforts have been made to meet these objections by keeping one side of glass dielectrics in contact with water warmed to the temperature of air or gas which is being ozonized on the other side; the idea being to keep the whole glass dielectric at as nearly a uniform temperature as possible.

The principal objection to mica or micanite for use as a dielectric, is that the laminated structure is not reliable, because the binding material is likely to be softened by heating and to thus permit of gradual disintegration. Furthermore it is impracticable to keep micanite cool, or of uniform temperature by applying water to one of its sides, because the water hastens the softening of the cement and disintegration of the dielectric.

The present invention consists in the employment as a dielectric agent, of fused silica or quartz which possesses qualities that make it free from all the objections above noted. A silica or quartz dielectric is indifferent to any temperature conditions to which it may be exposed, as the expansion co-efficient of fused quartz or silica is so small that even the most extreme temperature changes produce internal stresses too slight to produce rupture. Furthermore a dielectric of this substance does not become to any appreciable extent a conductor until its temperature is very high and there is therefore no cumulative effect, as with glass tending to cause one spot to become more heated than the rest. A dielectric of this material is absolutely homogeneous, there is no possibility of its gradual deterioration by the loosening of various component parts, as frequently is the case in built up dielectrics of the mica class. The various qualities possessed by fused silica or quartz not only increase manifold the life of the dielectric, but also permit of the use of an ozonizer wherein the dielectric is maintained at a low temperature by means of cold water circulating on one side of it and as the production of ozone is much increased by low temperature at the instant of formation, an ozonizer of this type is capable of higher efficiency than one made with ordinary dielectrics.

In the accompanying drawings, I have illustrated, principally in central section, a well known form of ozonizer, the construction of which I do not claim, but which serves to illustrate one application of my improvements.

In the drawings 1, is a dielectric of quartz or silica which may have been fused and thus brought into proper and convenient form for application and use.

2, is one of the electrodes and the other electrode is the water 3, and they are properly insulated from each other and fitted with appropriate conductors 4 and 5. Air or other material to be treated is passed in at 6, and out through the perforated walls of the electrode 2, and thence out of the apparatus at 7, or if desired, the direction of the path may be reversed. The electrical discharge takes place between the electrodes 2 and 3, and therefore through the dielectric 1.

8, is a water jacket and the material of which it is made is not material, although cast or sheet iron may be given as an example. The temperature of the water jacket may be such as to keep the adjacent face of the dielectric at a much lower temperature than that of the air or material being treated, which is advantageous for the reasons stated.

When the water is applied directly to one face of the dielectric, as has been described, the dielectric when constructed of quartz or silica, may be cooled by the water as much as possible without injury to it and with an increased yield in the process.

I claim:

1. An ozonizer consisting of terminals or electrodes with a gap between them means for passing high tension current between the electrodes and a homogeneous dielectric of silica arranged between the electrodes and through which current passes and which is unaffected by water and possessed of a temperature co-efficient of expansion so low that the greatest temperature changes produce internal stresses too small to cause rupture.

2. An electrical ozonizer consisting of electrical terminals or electrodes with a gap between, means for passing current between the electrodes a dielectric partition arranged between the electrodes and through which current passes and composed of fused silica, means for passing the substance to be ozonized between the electrodes, and devices for cooling the dielectric below the temperature of said substances, substantially as described.

In testimony whereof, I have hereunto signed my name.

EDWARD WANTON SMITH.

Witnesses:
A. B. STOUGHTON,
F. E. FRENCH.